(12) United States Patent
Turner et al.

(10) Patent No.: US 8,604,750 B2
(45) Date of Patent: Dec. 10, 2013

(54) ELECTRIC VEHICLE CHARGING STATIONS WITH TOUCH SCREEN USER INTERFACE

(75) Inventors: Dexter Turner, West Linn, OR (US); James B. Wakeen, Hillsboro, OR (US); Richard L. Knight, Lake Oswego, OR (US); Martin D. Dill, Brush Prairie, WA (US); Gerhard Gross, Portland, OR (US)

(73) Assignee: Optimization Technologies, Inc., Portland, OR (US)

( * ) Notice: Subject to any disclaimer, the term of this patent is extended or adjusted under 35 U.S.C. 154(b) by 282 days.

(21) Appl. No.: 13/033,179

(22) Filed: Feb. 23, 2011

(65) Prior Publication Data

US 2011/0239116 A1    Sep. 29, 2011

Related U.S. Application Data

(63) Continuation-in-part of application No. 12/954,209, filed on Nov. 24, 2010.

(60) Provisional application No. 61/307,318, filed on Feb. 23, 2010, provisional application No. 61/409,108, filed on Nov. 1, 2010, provisional application No. 61/307,377, filed on Feb. 23, 2010, provisional application No. 61/353,944, filed on Jun. 11, 2010, provisional application No. 61/317,181, filed on Mar. 24, 2010.

(51) Int. Cl.
*H02J 7/00* (2006.01)
*G06F 15/16* (2006.01)

(52) U.S. Cl.
USPC ............................ 320/109; 320/104; 709/207

(58) Field of Classification Search
USPC ..................................... 320/109, 104; 709/207
See application file for complete search history.

(56) References Cited

U.S. PATENT DOCUMENTS

| | | | |
|---|---|---|---|
| 4,532,418 A | 7/1985 | Meese et al. | |
| 5,202,617 A | 4/1993 | Nor | |
| 5,306,999 A | 4/1994 | Hoffman | |
| 5,327,066 A * | 7/1994 | Smith | 320/109 |
| 5,369,352 A | 11/1994 | Toepfer et al. | |
| 6,225,776 B1 | 5/2001 | Chai | |
| 6,727,809 B1 | 4/2004 | Smith | |
| 7,256,516 B2 | 8/2007 | Buchanan et al. | |
| 2004/0233055 A1 * | 11/2004 | Canich et al. | 340/539.26 |
| 2009/0287578 A1 | 11/2009 | Paluszek et al. | |
| 2009/0313032 A1 | 12/2009 | Hafner et al. | |
| 2010/0013434 A1 | 1/2010 | Taylor-Haw et al. | |
| 2010/0039067 A1 | 2/2010 | Hill et al. | |
| 2010/0181959 A1 | 7/2010 | Gibbs et al. | |
| 2010/0213896 A1 | 8/2010 | Ishii et al. | |

(Continued)

FOREIGN PATENT DOCUMENTS

| | | |
|---|---|---|
| WO | WO 2009/091745 | 7/2009 |
| WO | WO 2010/011545 | 1/2010 |
| WO | WO 2010/051477 | 5/2010 |

*Primary Examiner* — M'Baye Diao
(74) *Attorney, Agent, or Firm* — Klarquist Sparkman, LLP

(57) ABSTRACT

Disclosed herein are representative embodiments of methods, apparatus, and systems for using and operating electric vehicle charging stations ("EVCSs") or electric vehicle supply equipment ("EVSE") having a touch screen. The touch screen display device can be used, for example, to facilitate user interface with the EVCS/EVSE. The touch screen display apparatus can provide a quick and efficient means for a user to input a wide variety of information. Also disclosed herein are representative embodiments of a network communication system for EVCSs or EVSE.

42 Claims, 10 Drawing Sheets

(56) References Cited

U.S. PATENT DOCUMENTS

| | | |
|---|---|---|
| 2011/0106329 A1 | 5/2011 | Donnelly et al. |
| 2011/0140656 A1 | 6/2011 | Starr et al. |
| 2011/0169447 A1 | 7/2011 | Brown et al. |
| 2011/0204847 A1 | 8/2011 | Turner |
| 2011/0213656 A1 | 9/2011 | Turner |
| 2011/0238861 A1* | 9/2011 | Hutchinson .................. 709/238 |

* cited by examiner

700
Started charging on outlet 1
Thank you!
FIG. 7
800
Plug your vehicle in and then select the port that you plugged into
 1
120VAC Receptacles
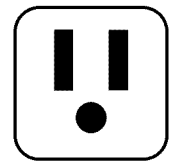 2
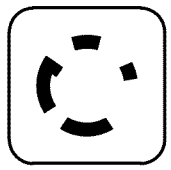 3
240VAC Receptacles
 4
FIG. 8

900

Plug your vehicle in and then select the port that you plugged into

1  Charging begins at 10:00 p.m. Press to cancel    120VAC Receptacles    2

240VAC Receptacles 
3                                                    4

1000

Plug your vehicle in and then select the port that you plugged into 1    120VAC Receptacles   2

240VAC Receptacles 
3                                                    4

ELECTRIC VEHICLE CHARGING STATIONS WITH TOUCH SCREEN USER INTERFACE

CROSS-REFERENCE TO RELATED APPLICATIONS

This application is a continuation-in-part of U.S. Nonprovisional application Ser. No. 12/954,209, filed on Nov. 24, 2010, and entitled "ELECTRIC VEHICLE CHARGING STATION ADVERTISING SYSTEMS", which claims the benefit of U.S. Provisional Application No. 61/307,318, filed on Feb. 23, 2010, and entitled "ELECTRIC VEHICLE CHARGING STATION WITH TOUCH SCREEN USER INTERFACE"; U.S. Provisional Application No. 61/409,108, filed on Nov. 1, 2010, and entitled "ELECTRIC VEHICLE CHARGING STATION WITH TOUCH SCREEN USER INTERFACE"; U.S. Provisional Application No. 61/307,377, filed on Feb. 23, 2010, and entitled "ELECTRIC VEHICLE CHARGING STATION ADVERTISING SYSTEM"; U.S. Provisional Application No. 61/353,944, filed on Jun. 11, 2010, and entitled "ELECTRIC VEHICLE CHARGING STATION ADVERTISING SYSTEM"; and U.S. Provisional Application No. 61/317,181, filed on Mar. 24, 2010, and entitled "ELECTRIC VEHICLE CHARGING STATION PARKING METER SYSTEM", all of which are hereby incorporated herein by reference.

FIELD

This application relates to electric vehicle charging stations and associated systems.

SUMMARY

Disclosed below are representative embodiments of methods, apparatus, and systems relating to electric vehicle charging stations ("EVCSs"), electric vehicle supply equipment ("EVSE"), and a network communications system for EVCSs and/or EVSE. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Among the embodiments disclosed herein is a network communications system for an electric vehicle charging station ("EVCS") or electric vehicle supply equipment ("EVSE") equipped with a touch screen display device. The touch screen display device can be used, for example, to facilitate user interface with the EVCS/EVSE. The touch screen display apparatus can provide a quick and efficient means for a user to input a wide variety of information. For example, the information can include one or more of access codes, passkeys, user identifications, passwords, and/or other means to validate the user's ability to access the charging station or to determine correct billing information for the electricity delivered to or received from the electric vehicle plugged into the EVCS/EVSE. The touch screen display device can also be used to display a wide variety of information to the user. For example, the information displayed to the user can include one or more of step-by-step instructions to users to assist in the safe operation of the EVCS/EVSE (including illustrations, photos, diagrams, and other such pictoral and graphical representations), trouble-shooting instructions to users and/or maintenance personnel to assist in resolving malfunctions or other issues that may arise during the operation of the EVCS/EVSE (including illustrations, photos, diagrams, and other such pictoral and graphical representations), account status, alerts, and maintenance information related to the vehicle plugged into the EVCS/EVSE. The touch screen display device can also provide a means to allow the user or maintenance personnel servicing the EVSE to contact the EVCS/EVSE operator and engage in an interactive exchange of information (e.g., via a textual chat, teleconference, video conference and/or tele-video conference session). Thus, embodiments of the disclosed technology improve the process of connecting an electric vehicle to the power grid via an EVCS/EVSE for charging purposes by providing users and maintenance personnel with a user interface that allows them to use the EVCS/EVSE more efficiently and safely and/or that provides functionality not possible with a non-touch-screen-equipped EVCSs/EVSE (e.g., the ability to view and interact with pictorial operation and troubleshooting instructions, or to conduct videoconference sessions with EVCS/EVSE operators).

In one exemplary method disclosed herein, a user interface is displayed on a display device of a EVCS or EVSE, an indication of user interaction with the EVCS or EVSE is received via a touch screen interface associated with the display device, a transaction is facilitated between a user and the EVCS or EVSE by which the user indicates that one or more electric vehicle batteries of an electric vehicle are to be charged via one of one or more charging ports of the EVCS or EVSE, and a charging operation is controlled that provides an electric charge to the one or more electric vehicle batteries of the electric vehicle via the one of the one or more charging ports of the EVCS or EVSE. In certain implementations, the act of facilitating the transaction between the user and the EVCS or EVSE comprises receiving user identification information and determining whether the user is authorized to use the EVCS or EVSE based on the user identification information. Further, the act of determining whether the user is authorized to use the EVCS or EVSE can comprise accessing user data stored locally at the EVCS or EVSE, or transmitting at least a portion of the user identification information to a remote computer and receiving a response from the remote computer indicating whether the user is authorized to use the EVCS or EVSE. In some implementations, the act of facilitating a transaction between the user and the EVCS or EVSE comprises displaying on the display device graphical depictions of available ones of the one or more charging ports, and receiving data through the touch screen interface indicating that the user touched a selected one of the graphical depictions. In certain implementations, the act of facilitating a transaction between the user and the EVCS or EVSE comprises displaying on the display device graphical depictions of two or more available methods of authorizing the charging operation, and receiving data through the touch screen interface indicating that the user touched a selected one of the graphical depictions. Further, the two or more available methods of authorizing the charging operation can include authorization through use of a credit card and authorization through use of a card indicating membership in an authorized group. In some implementations, the act of facilitating a transaction between the user and the EVCS or EVSE comprises detecting that the electric vehicle is not connected to the one of the one or more charging ports and displaying on the display device pictoral instructions for connecting the electric vehicle to the one of the one or more charging ports. In certain implementations, the act of controlling the charging operation comprises receiving a message from a remote computer indicating that the user is authorized to use the EVCS or EVSE, the received message including a portion of the message that indicates a priority level of the message. In such implementations, the priority level of the message can indicate a higher priority for the message relative to a message from the remote computer indicating vehicle health data or vehicle charging statistics, or the priority level of the message can indicate a lower priority for the message relative to a message from the remote computer directing the EVCS or EVSE to stop charging. In some implementations, the method further comprises receiving a message from a remote computer, the message including a portion indicative of a message expiration time.

Another exemplary embodiment disclosed herein is a an EVCS or EVSE comprising two or more charging ports configured to be coupled to an electric vehicle and to charge one or more batteries of the electric vehicle, a display device (the display device having a touch screen interface), and a computer processor. In certain implementations, the computer processor is programmed to cause a user interface screen to be displayed on the display device (the user interface screen prompting the user to select one of the two or more charging ports) and to receive data from the touch screen interface indicating user selection of a selected one of the two or more charging ports. In some implementations, the computer processor can be further programmed to cause a second user interface screen to be displayed on the display device (the second user interface prompting the user to select one of two or more methods of authorizing a charging operation at the selected one of the two or more charging ports) and to receive data from the touch screen interface indicating user selection of a selected one of the two or more methods of authorizing a charging operation. In certain implementations, the user interface screen is a first user interface screen, the EVCS or EVSE further comprises a wireless communication device, and the processor is further programmed to receive user identification data at the EVCS or EVSE, to cause transmission of at least a portion of the user identification information to a remote server via the wireless communication device, and to cause reception of a response from the remote server via the wireless communication device, the response indicating whether the user is authorized to use the EVCS or EVSE. The communication device can comprise one of a wireless mesh radio or a cellular radio. In some implementations, the EVCS or EVSE further comprises a card reader, and the user identification data is received from the card reader.

A further exemplary embodiment disclosed herein is a method in which the transmission of messages from a server to one or more EVCSs or EVSE is controlled by assigning message priority levels to multiple messages and controlling transmission of the messages such that messages assigned to a higher message priority level are transmitted sooner than message assigned to a lower message priority level. In certain implementations, the messages are ordered in a message queue according to the assigned message priority levels. In some implementations, the act of assigning the message priority level comprises assigning a higher message priority level to a message indicating that charging at one or more EVCSs or EVSEs is to stop relative to at least one other message priority level. In certain implementations, the act of assigning the message priority level comprises assigning a higher message priority level to a message indicating that charging is authorized at one or more EVCSs or EVSEs relative to at least one other message priority level. In some implementations, the act of assigning the message priority level comprises assigning a lower message priority level to a message indicating vehicle maintenance data or charge history data relative to at least one other message priority level. In certain implementations, the act of controlling transmission of messages from a server to one or more EVCSs or EVSE further comprises assigning a message expiration time to one or more of the messages, the assigned message expiration time indicating a time at which the one or more messages are to be disregarded by the one or more EVCSs or EVSE. In some implementations, the one or more of the messages can include one or more of the following attributes: a network security software version number, an EVCS/EVSE identity number, a message identity number, a message priority level, an expiration timestamp, or cyclic redundancy data. In certain implementations, the act of controlling transmission of the messages comprises interrupting transmission of a message with a lower message priority level in order to transmit a message with a higher message priority level. In some implementations, the act of controlling transmission of the messages comprises transmitting a message to one or more EVCSs/EVSE requesting that charging at the one or more EVCSs/EVSE cease, the transmission of the message being in response to power grid usage exceeding a threshold usage value or electrical prices exceeding a threshold price.

Many of the disclosed methods can be performed using computing hardware, such as a computer processor embedded in the EVCS/EVSE. For example, embodiments of the disclosed methods can be performed using software stored on one or more non-transitory computer-readable media (e.g., one or more optical media discs, volatile memory components (such as DRAM or SRAM), or nonvolatile memory or storage components (such as hard drives)). Such software can be executed by a computer processor embedded in the EVCS/EVSE or by one or more computers coupled to the EVCS/EVSE by a network (e.g., the Internet, a wide-area network, a local-area network, a client-server network, or other such network or any combination thereof). Embodiments of the disclosed methods can also be performed by specialized computing hardware (e.g., one or more application specific integrated circuits (ASICs) or programmable logic devices (such as field programmable gate arrays (FPGAs)) configured to perform any of the disclosed methods. Additionally, any intermediate or final result created or modified using any of the disclosed methods can be stored on one or more non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions which when executed by a computer cause the computer to perform any of the disclosed methods), intermediate results, or final results created or modified by the disclosed methods can be transmitted, received, or accessed through a suitable communication means.

The foregoing and other objects, features, and advantages of the disclosed technology will become more apparent from the following detailed description, which proceeds with reference to the accompanying figures.

BRIEF DESCRIPTION OF THE DRAWINGS

FIG. 7 illustrates an exemplary EVCS/EVSE screen showing a possible authorization screen to the user of the EVCS/EVSE.

FIG. 8 illustrates an exemplary EVCS/EVSE screen showing a second possible welcome screen to a user who desires to charge an electric vehicle and which indicates that a charging port is in use.

DETAILED DESCRIPTION

I. General Considerations

Figure 1:
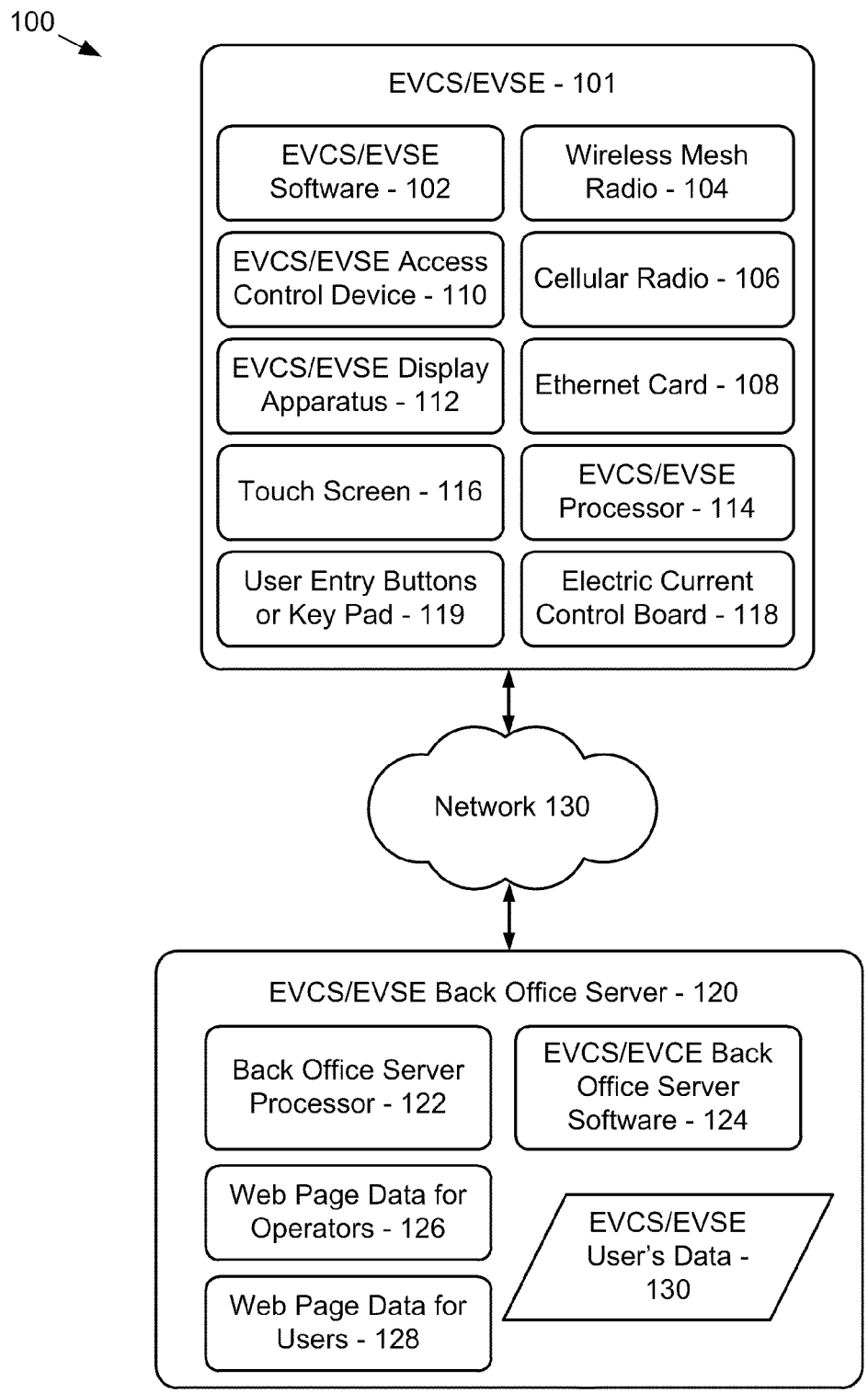
FIG. 1 is a schematic block diagram illustrating an exemplary electric vehicle charging system with a display device coupled to a back office serve via a network.

Disclosed below are representative embodiments of methods, apparatus, and systems for using and operating electric vehicle charging stations ("EVCSs") or electric vehicle supply equipment ("EVSE") having a touch screen. Also disclosed herein are representative embodiments of a network communication system for EVCSs or EVSE. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "monitor" to describe the disclosed methods. These terms are high-level abstractions of the actual operations that are performed. The actual operations that correspond to these terms may vary depending on the particular implementation and are readily discernible by one of ordinary skill in the art. Furthermore, as used herein, the term "and/or" means any one item or combination of items in the phrase.

Any of the disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer processor embedded in the EVCS/EVSE). Any of the intermediate or final data created and used during implementation of the disclosed methods or systems can also be stored on one or more computer-readable media (e.g., non-transitory computer-readable media).

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, C#, Objective C, Java, Perl, JavaScript, Adobe Flash, or any other suitable programming language Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions stored on a non-transitory computer-readable medium) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented using specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")) specially designed to implement any of the disclosed methods. The integrated circuit or specialized computing hardware can be embedded in or directly coupled to an EVCS/EVSE or device that is configured to interact with the EVCS/EVSE.

Figure 12:
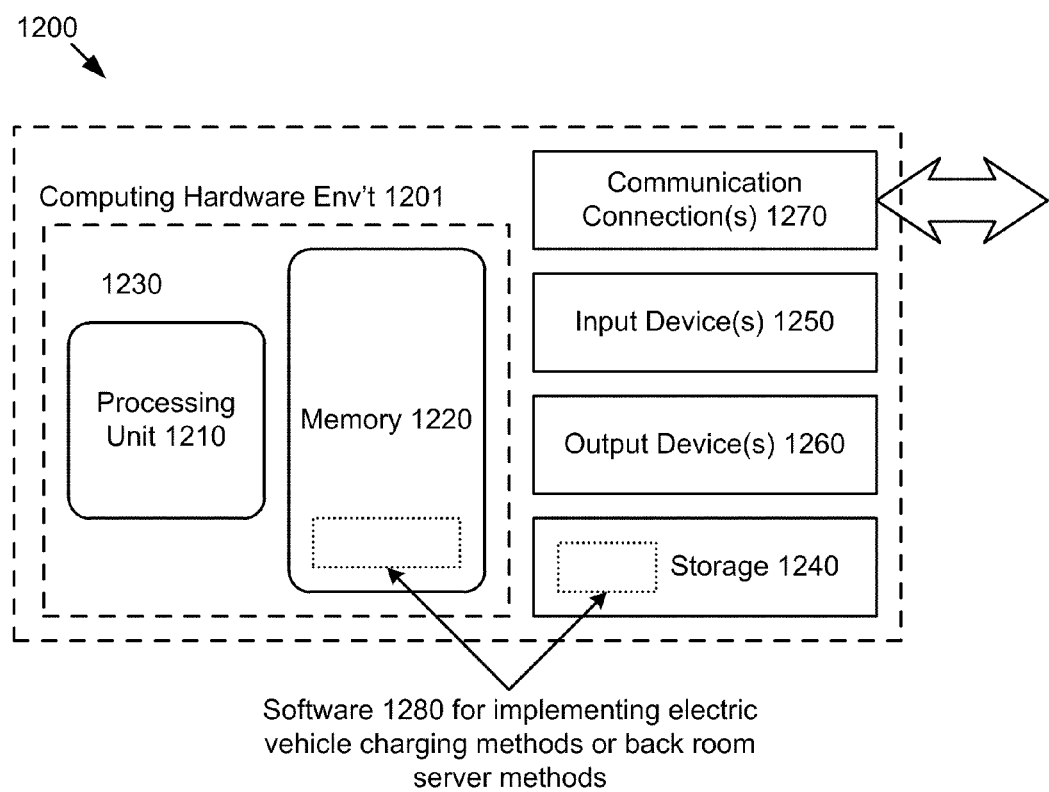
FIG. 12 is a schematic block diagram of an exemplary computing environment for implementing embodiments of the disclosed technology.

FIG. 12 is a schematic block diagram 1200 that illustrates a generalized example of a suitable computing hardware environment 1201 in which embodiments of the disclosed technology can be implemented. The computing hardware environment 1201 is not intended to suggest any limitation as to the scope of use or functionality of the disclosed technology, as the technology can be implemented in diverse general-purpose or special-purpose computing environments.

With reference to FIG. 12, the computing hardware environment 1201 includes at least one processing unit 1210 and memory 1220. In FIG. 12, this most basic configuration 1230 is included within a dashed line. The processing unit 1210 executes computer-executable instructions and may be a real or a virtual processor. In a multi-processing system, multiple processing units execute computer-executable instructions to increase processing power. The memory 1220 may be volatile memory (e.g., registers, cache, RAM, DRAM, SRAM), non-volatile memory (e.g., ROM, EEPROM, flash memory), or some combination of the two. The memory 1220 can store software 1280 for implementing one or more of the described techniques for operating or using the disclosed electric vehicle charging systems. For example, the memory 1220 can store software 1280 for implementing any of the disclosed methods and their accompanying user interfaces.

The computing hardware environment can have additional features. For example, the computing hardware environment 1201 includes storage 1240, one or more input devices 1250, one or more output devices 1260, and one or more communication connections 1270. An interconnection mechanism (not shown) such as a bus, controller, or network interconnects the components of the computing hardware environment 1201. Typically, operating system software (not shown) provides an operating environment for other software executing in the computing hardware environment 1201, and coordinates activities of the components of the computing hardware environment 1201.

Storage 1240 is a type non-volatile memory and can be removable or non-removable. The storage 1240 includes, for instance, magnetic disks (e.g., hard drives), magnetic tapes or cassettes, optical storage media (e.g., CD-ROMs or DVDs), or any other tangible non-transitory storage medium which can be used to store information and which can be accessed within or by the computing hardware environment 1201. The storage 1240 can store the software 1280 for implementing any of the described techniques, systems, or environments.

The input device(s) 1250 can be a touch input device such as a keyboard, mouse, touch screen, pen, trackball, a voice input device, a scanning device, or another device that provides input to the computing environment 1201. The output device(s) 1260 can be a display, touch screen, printer, speaker, or another device that provides output from the computing environment 1201.

The communication connection(s) 1270 enable communication over a communication medium to another computing entity. The communication medium conveys information such as computer-executable instructions, any of the intermediate or final messages or data used in implementing embodiments of the disclosed technology, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. For example, the communication connection(s) 1270 can communicate with another computing entity over a wired or wireless network (e.g., the Internet, a wide-area network, a local-area network, a WiFi network, a client-server network, a wireless mesh network, or other such network or any combination thereof).

Many of the methods, systems, and interfaces disclosed herein can be described in the general context of computer-executable instructions stored on one or more computer-readable media. Computer-readable media are any available media that can be accessed within or by a computing environment. By way of example, and not limitation, with the computing hardware environment 1201, computer-readable media include tangible non-transitory computer-readable media such as memory 1220 and storage 1240. The various methods, systems, and interfaces disclosed herein can also be described in the general context of computer-executable instructions, such as those included in program modules, being executed in a computing environment on a target real or virtual processor. Generally, program modules include routines, programs, libraries, objects, classes, components, data structures, and the like that perform particular tasks or implement particular abstract data types. The functionality of the program modules may be combined or split between program modules as desired in various embodiments. Computer-executable instructions for program modules may be executed within a local or distributed computing environment.

II. Exemplary Embodiments of the Disclosed Technology

FIG. 1 is a schematic block diagram 100 illustrating an EVCS/EVSE computing hardware environment 101 for implementing embodiments of the disclosed technology. In particular, FIG. 1 illustrates an exemplary computing hardware environment 101 for an EVCS/EVSE and an exemplary computing hardware environment 120 for an EVCS/EVSE back office server. The EVCS/EVSE environment 101 is more specialized than computing hardware environment 1201 but should not be construed as limiting the types of hardware that can be used to implement the disclosed technology. Furthermore, the EVCS/EVSE environment 101 and the exemplary computing hardware environment 120 for the EVCS/EVSE back office server can include any of the components described above with respect to the general computing hardware environment 1201.

The EVCS/EVSE computing hardware environment 101 includes software 102, which comprises computer-executable instructions stored on non-transitory computer-readable media (e.g., any one or more of the non-transitory computer-readable media described above). When executed, the software can be used to implement the functionality of the EVCS/EVSE, which is described in more detail below. The EVCS/EVSE computing hardware environment 101 further comprises an EVCS/EVSE processor 114 for executing the software 102. Suitable processors and associated parts can be obtained, for example, from Parvus Corporation. In the illustrated embodiment, the EVCS/EVSE processor 114 is interconnected to an electric current control board 118. The electric current control board 118, in turn, is connected to the cables and electrical connectors of the EVCS/EVSE that provide the electrical coupling to the one or more electric vehicles (e.g., using a SAE J1772™ connector, IEC 62196 electrical connector, or other such electric vehicle connector). Suitable electric current control boards and associated parts can be obtained, for example, from Texas Instruments, Riley Corp, and National Control Devices. In certain exemplary embodiments, the EVCS/EVSE software 102 is used to implement a process in which commands and data are exchanged to control the flow of electrical current between one or more electric vehicles plugged into the EVCS/EVSE (e.g., the EVCS/EVSE 240 shown in FIG. 2) and the power grid (e.g., the power grid 270 shown in FIG. 2). The EVCS/EVSE computing hardware environment 101 can also include one or more of a wireless mesh radio 104, a cellular radio 106 and/or an Ethernet card 108 (or other network adapter) to provide the environment 101 with a number of wired and wireless interface capabilities for exchanging data with, for example, an EVCS/EVSE back office server 120. Suitable wireless mesh radios and associated parts can be obtained, for example, from Digi International. Suitable cellular radios and associated parts can be obtained, for example, from Telit Communications Plc. In the illustrated embodiment, the EVCS/EVSE processor 114 includes Ethernet functionality but can include other network functionality. The EVCS/EVSE computing hardware environment 101 also includes an access control device 110, such as a magnetic card reader or radio frequency identity ("RFID") reader, and a display device 112, such as an LCD, LED, or plasma screen with a touch screen interface 116. The touch screen interface can be a resistive touch screen, a surface acoustic wave touch screen, a capacitive touch screen, infrared touch screen, optical imaging touch screen, dispersive signal touch screen, acoustic pulse recognition touch screen, or any other touch screen that enables position detection of user interaction with the display device. Another possible option to facilitate user interaction is using a display device without a touch screen interface but with a set of user entry buttons or a keypad 119. Although the exemplary EVCS/EVSE computing hardware environment 101 is shown as including both a touch screen 116 and a set of user entry buttons or keypad 119, the touch screen 116 can be implemented alone or the set of user entry button or keypad 119 can be implemented alone. Suitable magnetic card readers and associated parts can be obtained, for example, from ID Tech. Suitable display devices and touch screen interfaces can be obtained, for example, from Logic Supply. As more fully described below, the touch screen interface 116 can be used to facilitate the charging of the electric vehicle and the proper billing (or crediting) for the electricity used (or supplied) by the electric vehicle coupled to the EVCS/EVSE. As shown in FIG. 1, the EVCS/EVSE computing hardware environment 101 is coupled to the EVCS/EVSE back office server environment 120 via the network 130 (e.g., the Internet, a wide-area network, a local-area network, a Wi-Fi network, a client-server network, a wireless mesh network, or other such network or any combination thereof). In particular embodiments, the back office server environment 120 is implemented as part of a cloud-based back office server.

In operation, the EVCS/EVSE computing hardware environment 100 can create a number of data packets or messages that are transmitted to the EVCS/EVSE back office server environment 102 via a network 130. The EVCS/EVSE back office server environment 102 can receive these packets or messages and can also create data packets or messages that will be transmitted to the EVCS/EVSE computing hardware environment 100 via the network 130. During times of high usage of the installed EVCSs/EVSE or to facilitate integration of the installed EVCSs/EVSE into a "smart" electric power grid for purposes of allowing the electric power grid operators to control the charging of connected electric vehicles (e.g., to limit the charging of connected electric vehicles during peak electricity usage times or times of high electrical prices), many messages can be sent between a number of EVCSs/EVSE and one or more EVCS/EVSE back office servers. Both the EVCS/EVSE computing hardware environment 100 and the EVCS/EVSE back office server environment 120 can therefore include data packet or message control functionality that will allow for the prioritization of data packets or messages. An exemplary method and system for communicating between the EVCS/EVSE computing hardware environment 100 and the back office server environment 120 is described below in connection with FIG. 13.

Figure 11:
FIG. 11 is an image of an exemplary EVCS/EVSE having a touch screen display device in accordance with embodiments of the disclosed technology.

FIG. 11 is an image of an EVCS/EVSE 1100 in which the EVCS/EVSE environment 101 is implemented. As shown in FIG. 11, the display apparatus is desirably located in a position that allows for easy viewing by a user.

Returning to FIG. 1, the back office server environment 120 can be implemented using a wide variety of computers and/or servers (e.g., a suitable commercially available server). In FIG. 1, the back office server environment 120 includes back office server software 124, which can comprise computer-executable instructions stored on non-transitory computer-readable media (e.g., any one or more of the non-transitory computer-readable media described above). When executed, the software can be used to implement the functionality of the back office server, which is described in more detail below. The EVCS/EVSE back office server 120 further comprises a back office server processor 122 for executing software 124. Also shown in FIG. 1 is EVSC/EVSE user data 130. The EVSC/EVSE user data 130 can comprise data stored on non-transitory computer-readable media that is related to users of the EVCS/EVSE. For example, the data can include data about a user's identification, address, account, usage history, vehicle, and/or other such user data.

In the illustrated embodiment, the EVCS/EVSE back office server 120 also includes data 126 for implementing one or more web pages for an EVCS/EVSE operator. The web page data 126 can comprise data stored on non-transitory computer-readable media that is used to render or otherwise implement one or more web pages for display to an EVCS/EVSE operator. The web pages can be displayed, for example, using a suitable internet browser or media player implemented at a computer operated by the EVCS/EVSE operator and coupled to the back office server 120 via a network (e.g., the Internet, a wide-area network, a local-area network, a Wi-Fi network, a client-server network, a wireless mesh network, or other such network or any combination thereof). The web page data can be in any format or language suitable for implementing web pages (e.g., HTML, Flash, Java, and the like). In other embodiments, the data to be displayed to the EVCS/EVSE operator is not stored as web page data, but as data usable via a non-web-based user interface (e.g., a dedicated program that directly interfaces with the back office server 120).

The EVCS/EVSE back office server 120 can also include data 128 for implementing one or more web pages for an EVCS/EVSE user. The web page data 128 can comprise data stored on non-transitory computer-readable media that is used to render or otherwise implement one or more web pages for display to an EVCS/EVSE user. The web pages can be displayed, for example, using a suitable internet browser or media player implemented at a computer operated by the EVCS/EVSE user and coupled to the back office server 120 via a network (e.g., the Internet, a wide-area network, a local-area network, a Wi-Fi network, a client-server network, a wireless mesh network, or other such network or any combination thereof). The web page data can be in any format or language suitable for implementing web pages (e.g., HTML, Flash, Java, and the like). In other embodiments, the data to be displayed to the EVCS/EVSE user is not stored as web page data, but as data usable via a non-web-based user interface (e.g., a dedicated program that directly interfaces with the back office server 120). In certain embodiments, the web page data 128 is data for implementing web pages that show the user information about the state of charge of the user's electric vehicle. For example, the web page data can include data for implementing a log-in screen, through which the user provide authentication information indicating that the user is a member of a group authorized to use an EVCS/EVSE in a network of EVCSs/EVSE controlled by the back EVCS/EVSE back office server 120, and a data for implementing a charge status screen, through which the user is presented a graphical or numerical indication of the charge status of the battery in the user's vehicle. The EVCS/EVCE back office server software 124 can include code that receives information about the identity of the user at the log-in screen, matches the identity to an electric vehicle at one of the EVCSs/EVSE controlled by the back office server, receives information about a charge state of the user's electric vehicle at the one of the EVCSs/EVSE, and causes the display of the information about the charge state of the user's electric via one or more web pages displayed to the user. The information about the charge state can comprise, for instance, the amount of time the user's vehicle has been charging or an indication of the percentage or amount to which the user's vehicle is charged.

Figure 2:
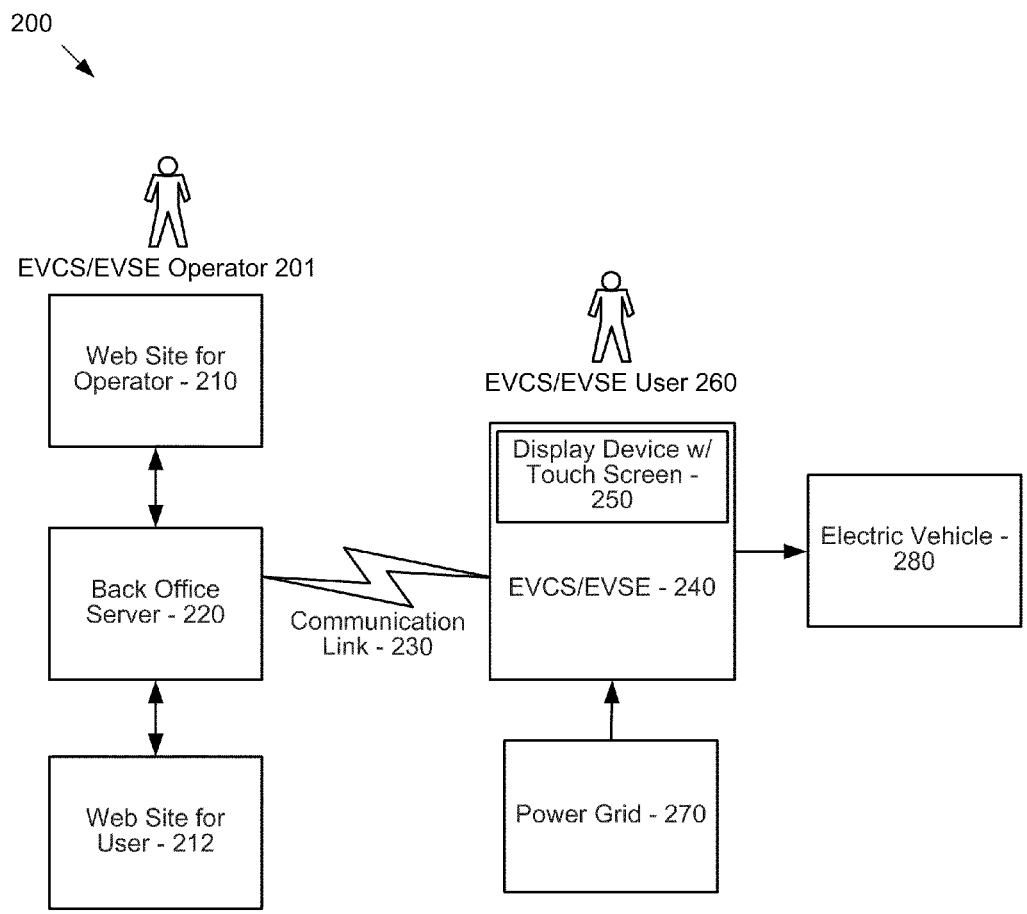
FIG. 2 is a schematic block diagram illustrating an exemplary EVCS/EVSE system and the users of the exemplary system.

FIG. 2 is a schematic block diagram 200 illustrating an exemplary EVCS/EVSE system and the users of the exemplary system. In FIG. 2, a user 260 interfaces with an EVCS/EVSE 240 using a display device equipped with a touch screen interface 250. The display device equipped with a touch screen interface 250 allows the user to view operating instructions and/or to make entries of information. As noted above, the functionality of the display device equipped with a touch screen interface 250 can be implemented by executing appropriate EVCS/EVSE software stored at the EVCS/EVSE (e.g., EVCS/EVSE software 102). The EVCS/EVSE 240 uses a communication device (e.g., one or more of the wireless mesh radio 104, cellular radio 106, or Ethernet card 108 shown in FIG. 1) to establish a communication link 230 with a back office server 220. The functionality of the back office server 220 can be implemented by executing appropriate back office software stored at the back office server 220 (e.g., back office server software 124). The EVCS/EVSE 240 also uses the communication device to transmit information entered by the user 260 to the back office server 220. This information can comprise, for example, data read from the user's identification device (e.g., a card, key, or other device for authenticating the user at the EVCS/EVSE 240) or entries made by the user via the display device equipped with a touch screen interface 250. The data from the user's identification device can be read using an access control device (e.g., access control device 110). Once user identification information is received by the back office server 220, the ability of the user to access the EVCS/EVSE can be determined (e.g., using the stored user's data 130). If the user is an authorized user, the back office server 220 transmits authorization information back to the EVCS/EVSE 240 via the communication link 230. The EVCS/EVSE 240 can then display appropriate further instructions to the user 260 using the display device 250 equipped with touch screen interface. The user 260 can also use the display device 250 equipped with a touch screen to request and view operating instructions or, in the event of a malfunction, request and view troubleshooting instructions. The back office server 220 is also configured to operate a web site 210 for exchanging information relating to the EVCS/EVSE with an EVCS/EVSE operator 201. The information can comprise, for example, the current status of EVCS/EVSE 240, maintenance records of the EVCS/EVSE 240, or other such information. The back office server 220 in FIG. 2 is further configured to operate a website 212 for exchanging information relative to the EVSE/EVSE with the EVCS/EVSE user 260. The information can comprise, for example, the current status of the charge of the electric vehicle 260, account records for the user, or other such information.

In particular embodiments and in the event of a malfunction, the EVCS/EVSE user 260 can use the display apparatus equipped with a touch screen 250 to request a live information exchange session with the EVCS/EVSE operator 201. The live information exchange session can comprise, for example, a textual chat, videoconference, or teleconference with the EVCS/EVSE operator 201. For instance, upon receipt of this request from the EVCS/EVSE 240 via the communication link 230, the back office server 220 will notify the EVCS/EVSE operator 201 of the request using a web site 210 and web pages. The operator 201 can respond to the request and conduct the live information exchange using the web site 210 (e.g., using a suitable text, video, or teleconferencing application). Data exchanged between the user 260 and the operator 201 can be exchanged, for example, between the back office server 220 and the EVCS/EVSE 100 using the communication link 230.

Figure 13:
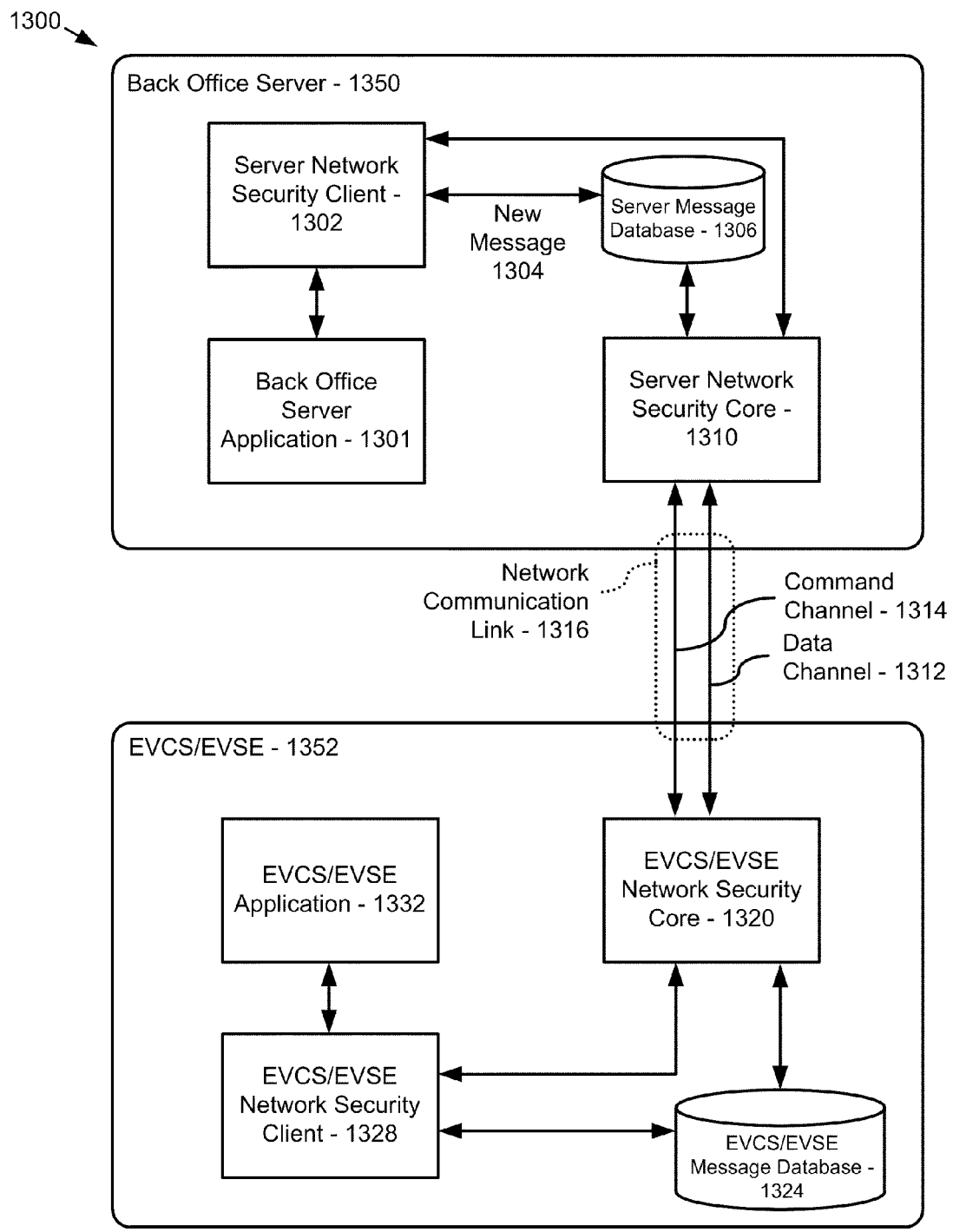
FIG. 13 is a schematic block diagram of an exemplary network communication environment for implementing embodiments of the disclosed technology

FIG. 13 is a schematic block diagram 1300 illustrating a network communication scheme for sending and receiving messages between a back office server (e.g., back officer server 120, 220) and a selected EVCS/EVSE (e.g., EVCS/EVSE 101, 240) according to one embodiment of the disclosed technology. For illustrative purposes, the discussion below describes a communication path from a back office server 1350 to an EVCS or EVSE ("EVCS/EVSE") 1352. It is to be understood, however, that the EVCS/EVSE 1352 can generate and transmit messages to the back office server 1350 in a similar fashion, but in the reverse direction.

In FIG. 13, the back office server application 1301 creates a message packet for transmission to a specific charging station (here, EVCS/EVSE 1352, which may be identified by a charging station ID). Communication between the EVCS/EVSE 1352 and the back office server 1350 occurs through server network security core 1310 and EVCS/EVSE network security core 1320. The server network security cores 1310 is a software service called by the back office application 1301 on the back office server 1350, and the EVCS/EVSE network security core 1320 is a software service called by the EVCS/EVSE application 1332 on the EVCS/EVSE 1352. The server network security core 1310 and the EVCS/EVSE network security core 1320 facilitate secure communication between the back office server 1350 and the EVCS/EVSE 1352. For example, in certain implementation, the OpMessaging peer-to-peer messaging system available from Optimization Technologies is used to implement the network security cores (and certain aspects of the network security clients). In the illustrated embodiment, the back office server application 1301 is a software application used to implement at least some of the functionality of the back office server (e.g., software for performing the exemplary method illustrated in FIG. 4), and the EVCS/EVSE application 1332 is a software application used to implement at least some of the functionality of the EVCS/EVSE (e.g., software for performing the exemplary method illustrated in FIG. 3).

Once the EVCS/EVSE network security core 1320 has been started and the service is running, it uses one or more of the EVCS/EVSE's wired or wireless interfaces to establish a communication link 1316 with the back office server network security core 1310. This communication link 1316 can comprise a command channel 1314 over which commands such as a charging station request for secure connection are sent and a data channel 1312 over which the actual message packets are sent. The network security cores 1310, 1320 establish a secure link by exchanging encryption keys and encrypted identification information. Once the network security cores 1310, 1320 have established a secure link, each of the network security cores 1310, 1320 notifies its respective network security clients 1302, 1328 that the communication link 1316 is available. In general, and as more fully illustrated below, the server network security client 1302 is a software service for managing communications between the back office server 1350 and one or more EVCS/EVSE, including the generation and maintenance of a queue of message, arranged according to priority, and stored in server message database 1306. Similarly, the EVCS/EVSE network security client 1328 is a software service for managing communication between the EVCS/EVSE 1352 and the back office server 1350, including the generation and maintenance of a queue of message, arranged according to priority, and stored in EVCS/EVSE message database 1324.

Certain embodiments of the back office server operate in the following manner. When the back office server 1350 wants to send a message (e.g., new message 1304) to a charging station (e.g., EVCS/EVSE 1352), the back office server application 1301 calls the server network security client 1302, which is started and controlled by the back office server application 1301. The message is transferred to the network security client 1302 along with other attributes (or properties) for the message. In some embodiments, these attributes are implemented as fields or syntax elements that accompany the message according to a message protocol. The attributes can include one or more of the following: a message priority level (e.g., low, medium, or high, or any other indication of two or more available priority levels), a message expiration timestamp, an EVCS/EVSE identity number (indicating to which EVCS/EVSE the message is to be sent), or a cyclic redundancy check ("CRC") of the complete packet containing the actual message payload and its attributes. The server network security client 1302 encrypts the message packet, temporarily stores the new message 1304 in the server message database 1306 and notifies the server network security core 1310 that the message has been placed in the server message database 1306. In certain embodiments, messages in the server message database 1306 are ordered by the server network security client 1302 into a message queue that determines the order in which they will be sent by the server network security core 1310. In one exemplary implementation, the server network security client 1302 is responsible for managing the queue of messages in the server message database 1306. When new messages (e.g., the new message 1304) are placed in the server message database 1306, the server network security client 1302 looks at the new message's priority level and determines its place in the queue based on this priority (highest priority first, next highest priority second, and so on to the lowest priority message). In certain implementations, the server network security core 1310 continually transmits messages to the appropriate charging station's network security core 1320 as long as there are messages in the message queue. If the new message 1304 placed into the server message database 1306 is the highest priority relative to all of the other messages in the queue, it is ordered in a position such that it is transmitted first. In some implementations, if the server network security core 1310 is in the middle of sending another message when the new message 1304 is placed in the server message database 1306 with the highest priority, the server network security core 1310 will interrupt the transmission of the current message and begin sending the new, highest priority message. Once the highest priority message has completed sending, the server network security core 1310 will move on to the next lower priority message. If that is the message that was interrupted by this higher priority message, its transmission will be resumed from where it left off. If a message with a higher priority than this interrupted message (but not higher than the new message 1304 with the highest priority) had been placed in the queue while message 1304 was being sent, this message is now the highest priority so it will be sent and the interrupted message will not be resumed until the higher priority message is sent. Alternatively, the server network security core 1310 will complete transmission of a message before sending any new, higher priority message.

In addition to the message priority level, and as mentioned above, messages can also be assigned an expiration timestamp. In certain embodiments, if the current system clock reaches this time before the message has been sent, the message will not be sent but instead will be deleted from the queue and the server network security client 1302 will notify the back office server application 1301 that the message was not sent before it expired. The server network security client 1302 can continually update the queue of messages in the server message database 1306 by deleting any expired messages. For example, the server network security client 1302 can update the message queue at regular intervals.

Some embodiments of the EVCS/EVSE operate in the following manner. When a message is received by the EVCS/EVSE network security core 1320, it is placed in the EVCS/EVSE message database 1324 by the EVCS/EVSE network security core 1320. The EVCS/EVSE network security core 1320 then notifies the EVCS/EVSE network security client 1328 that the new message is in the EVCS/EVSE message database 1324. The EVCS/EVSE network security client 1328 notifies the EVCS/EVSE application 1332 that the message is available. The EVCS/EVSE network security client 1328 can also evaluate the expiration timestamp of the new message. The EVCS/EVSE application 1332 will notify the EVCS/EVSE network security client 1328 that it wants the message and the EVCS/EVSE network security client 1328 will decrypt the message using the software interface between the EVCS/EVSE network security client and the EVCS/EVSE application to send the message's payload to the EVCS/EVSE application 1332. Once the EVCS/EVSE application 1332 has the message, the EVCS/EVSE network security client 1328 will send an acknowledgement back to the server network security client 1302 via the network security cores 1320, 1310. Once the server network security client 1302 receives the acknowledgement, it will notify the back office server application 1301 that the message made it to its destination. If the EVCS/EVSE network security client 1328 determines that the message expired before the EVCS/EVSE application 1332 retrieves it, the message will be deleted from the EVCS/EVSE message database 1324, the EVCS/EVSE application 1332 will be notified that the message expired, and the server network security client 1302 will be notified that the message did not make it to its destination before it expired.

Messages originating in the EVCS/EVSE and going to the back office server can work in the reverse direction but in the same manner.

The network communication system for use with the disclosed EVCS/EVSEs can have a wide variety of features and perform a wide variety of functions. In certain embodiments, the network communication system is capable of one or more of the following (either alone or in combination or subcombination with one another): messages being encrypted during the transmission between the network security cores 1310 and 1320; one network security core will not allow a connection to another network security core with a different encryption setting; the network communications system will use a secure sockets layer ("SSL") socket for transmission control protocol ("TCP") communications between network security cores; the network security cores will exchange certificates when connecting to authenticate themselves to each other; a network security core will refuse to connect to another core whose certificate is deemed invalid; and/or messages will be encrypted using randomly generated keys, which are transmitted as part of the message announcement over the SSL socket (the command channel).

Furthermore, the messages that are used in the network communication system can have a wide variety of formats and syntaxes. In certain embodiments of the system, message packets comprise one or more of the following attributes (either alone or in combination or subcombination with one another): a network security software version number (e.g., the version that was used to create the packet); an EVCS/EVSE identity number (indicating to which EVCS/EVSE the message is to be sent); a message ID number (e.g., created by the client); a priority level (e.g., low, medium, or high, although any number of priority levels greater than two is possible); an expiration timestamp; and/or a CRC message content or payload.

One application of this communication technology is to allow higher-priority messages (such as messages from the electric power grid operators requesting the discontinuation or delay of charging of certain connected electric vehicles at one or more EVCS/EVSE) to be transmitted before lower-priority messages (such as charging station usage records or electric vehicle maintenance records that were captured from connected electric vehicles). For example, a message can be sent to one or more EVCSs or EVSE directing the EVCSs or EVSE to discontinue charging if the power usage on the power grid supplying power to the network exceeds a certain threshold value or if the price of electricity on the power grid exceeds a certain price. The message can be triggered automatically, or can be sent at the request of the operator.

Figure 3:
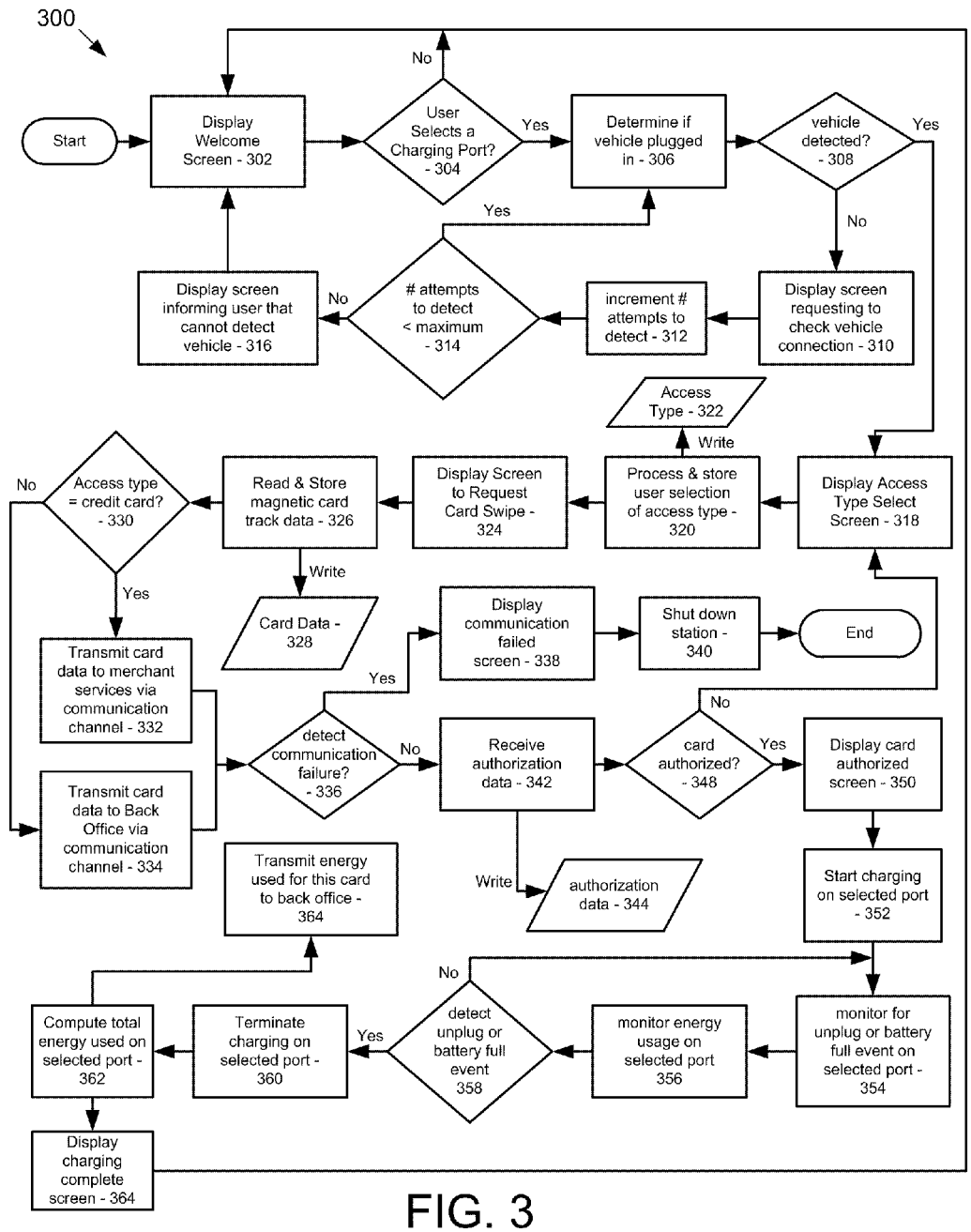
FIG. 3 is a flowchart of an exemplary method for performing a charging operation at an EVCS/EVSE according to an embodiment of the disclosed technology.

FIG. 3 is a flow chart 300 showing an exemplary process for performing a charging procedure at an EVCS/EVSE. As noted above, the functionality shown in FIG. 3 can be implemented by computing hardware executing computer-executable instructions. The various procedures shown in FIG. 3 should not be construed as limiting, as any one or more of the procedures can be performed alone or in various other combinations and subcombinations in accordance with the disclosed technology.

Figure 5:
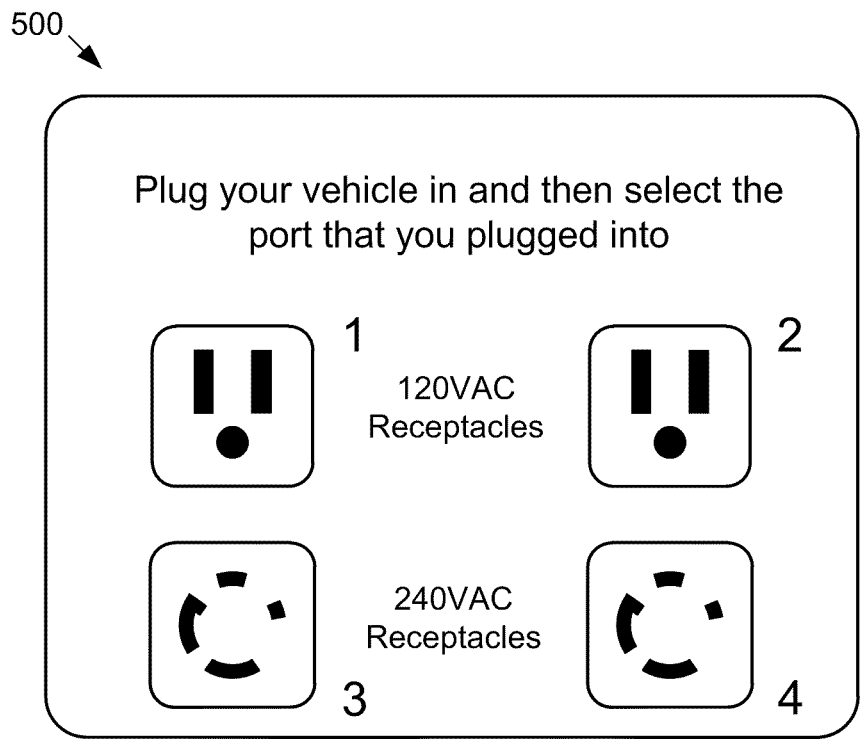
FIG. 5 illustrates an exemplary EVCS/EVSE screen showing a first possible welcome screen to a user who desires to charge an electric vehicle.
Figure 9:
FIG. 9 illustrates an exemplary EVCS/EVSE screen showing a third possible welcome screen to a user who desires to charge an electric vehicle and which indicates that charging on one of the charging ports will begin at a later time.
Figure 9:
Figure 9:
Figure 10:
FIG. 10 illustrates an exemplary EVCS/EVSE screen showing a fourth possible welcome screen to a user who desired to charge an electric vehicle and which indicates that one of the charging ports is unavailable.
Figure 10:
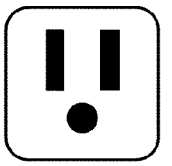
Figure 10:
Figure 10:

In particular embodiments, and upon startup or after the user indicates that they want to perform a charging operation (e.g., by interfacing with the touch screen interface or otherwise interacting with the EVCS/EVSE, and thereby indicating an intent to use the EVCS/EVSE), the EVCS/EVSE 240 will display a welcome screen (process block 302). An exemplary welcome screen that can be displayed is shown in screen shot 500 of FIG. 5. This welcome screen can also display to the user 260 which charging ports are currently in use and which ports are available at the EVCS/EVSE. For example, FIG. 8 is a screen shot 800 showing an example of a welcome screen in which one vehicle is already connected to the EVCS/EVSE and charging. FIG. 9 is a screen shot 900 showing an example of a welcome screen in which one vehicle is already connected and is waiting to be charged later. FIG. 10 is a screen shot 1000 showing an example of a welcome screen in which one port of the charging station is inoperative and unavailable for use.

When the user selects a charging port to use (process block 304), the selected port is monitored to determine whether a vehicle is plugged into the selected port (process blocks 306, 308). If a vehicle is not detected at the selected port, the EVCS/EVSE displays a message to the user stating that the EVCS/EVSE cannot detect a vehicle plugged into the selected port and instructs the user on how to correctly connect the vehicle to the EVCS/EVSE (process block 310). The EVCS/EVSE will again attempt to sense a vehicle plugged into the selected port. If a vehicle is still not detected, the EVCS/EVSE will again inform the user that it cannot detect a vehicle and provide connection instructions. This cycle will be repeated a number of times (e.g., a predetermined or operator-selected number of times). For example, for each attempt to detect a vehicle at the selected port, a variable storing the number of attempts can be incremented (process block 312). The number of attempts can then be compared to the maximum number of attempts allowed (process block 314) to determine whether further attempts should be made or whether a new display screen should be displayed to the user informing the user that the EVCS/EVSE cannot detect their vehicle and that the user should select a different port or that the user cannot use the EVCS/EVSE (process block 316).

Figure 6:
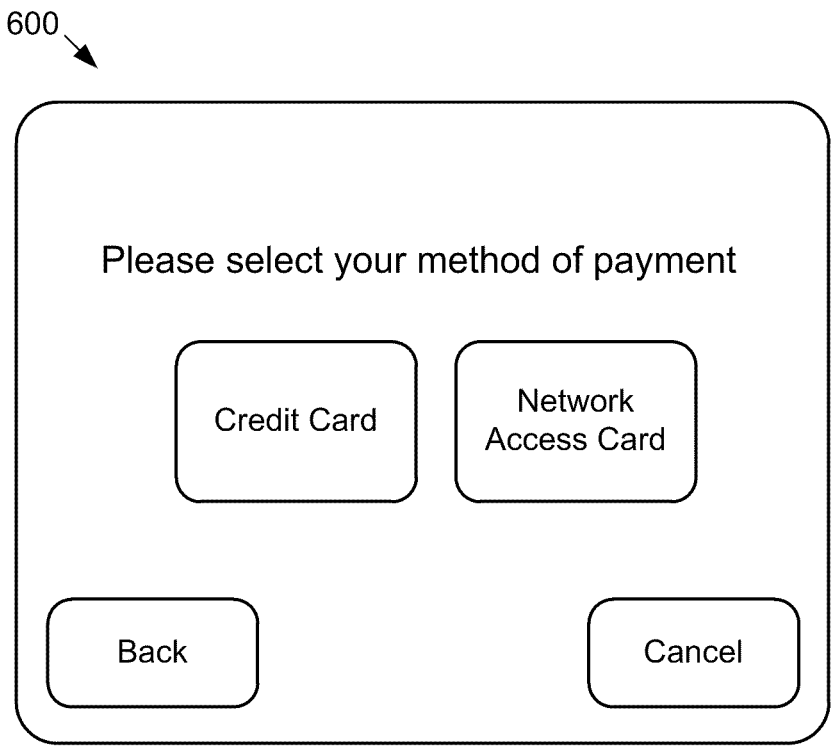
FIG. 6 illustrates an exemplary EVCS/EVSE screen showing a possible screen for identifying whether the user will use a network access card or whether the user will use a credit card.

If the EVCS/EVSE does detect a vehicle plugged into the selected port (process block 308), the EVCS/EVSE will display a screen requesting that the user select an access type (process block 318). FIG. 6 is a screen shot 600 showing an example of a suitable access type selection screen. The access type determines where the customer data is transmitted. Thus, the access type is processed and temporarily stored (process block 320) as access type data 322. In one particular embodiment, the access types include access using a credit card or access using a network access card associated with the operator of the EVCS/EVSE. The EVCS/EVSE then displays a screen requesting that the user swipe their card (process block 324). Information from the card is then read and stored (process block 326) as card data 328. Using the stored access type data 322, a determination is made as to whether the access type was access using a credit card (process block 330). If the access type was a credit card, the card information (card data 328) will be transmitted to the appropriate merchant services via a communication link with the EVCS/EVSE (process block 332). (In some embodiments, if the access types was a credit card, the card information is first transmitted to the back office server, which then transmits the credit information to the appropriate credit card merchant.) If the access type was a card associated with the operator of the EVCS/EVSE, the card data (card data 328) will be transmitted to the back office server via the communication link (process block 334). During any communication, a determination is made as to whether there exists a communication failure (process block 336). If there is a communications problem and the card data is not able to be sent, the EVCS/EVSE will display a failure message (process block 338) and display a message stating that the entire charging station is disabled for a maintenance issue (process block 340). Access to the EVCS/EVSE can be granted using a different type of access mechanism, such as an RFID device that is carried by the user or associated with their electric vehicle or through data received from the user's vehicle when the user connects their electric vehicle to one of the charging ports of the EVCS/EVSE.

If the EVCS/EVSE is able to successfully send the card data to the back office server, the EVCS/EVSE will wait to receive authorization data from the back office server. Once authorization data is received (process block 342), the data is stored as authorization data 344 and a determination is made as to whether the card is authorized (process block 348). If the card is not authorized, the EVCS/EVSE will again display the access type select screen (process block 318) to allow the user to use a different card to gain access. If the card is authorized to use the EVCS/EVSE, the EVCS/EVSE can display a screen indicating that the card is authorized (process block 350). Screen shot 700 of FIG. 7 shows an exemplary card authorized screen. It should be noted that in certain embodiments, charging is made available to the user free of charge so that a credit card and/or network access card is unnecessary. In certain implementations of such embodiments, the system may offer free vehicle charging only to those users who are members of the charging station network and swipe their network access card (or RFID) prior to charging.

Charging can then begin at the selected port (process block 352). During charging, the selected port is continuously monitored for an unplug or a battery fully charged event (process blocks 356, 358). If an unplug or battery fully charged event is detected, the EVCS/EVSE will terminate the charging on the selected port (process block 360), compute the total energy used on that port (process block 362) and transmit the total energy used to the back office server (process block 364) so that the charging session can be closed out. Charging statistics can then be temporarily displayed on the screen on a charging complete screen (process block 366). The screen will eventually revert to the welcome screen (process block 302).

Figure 4:
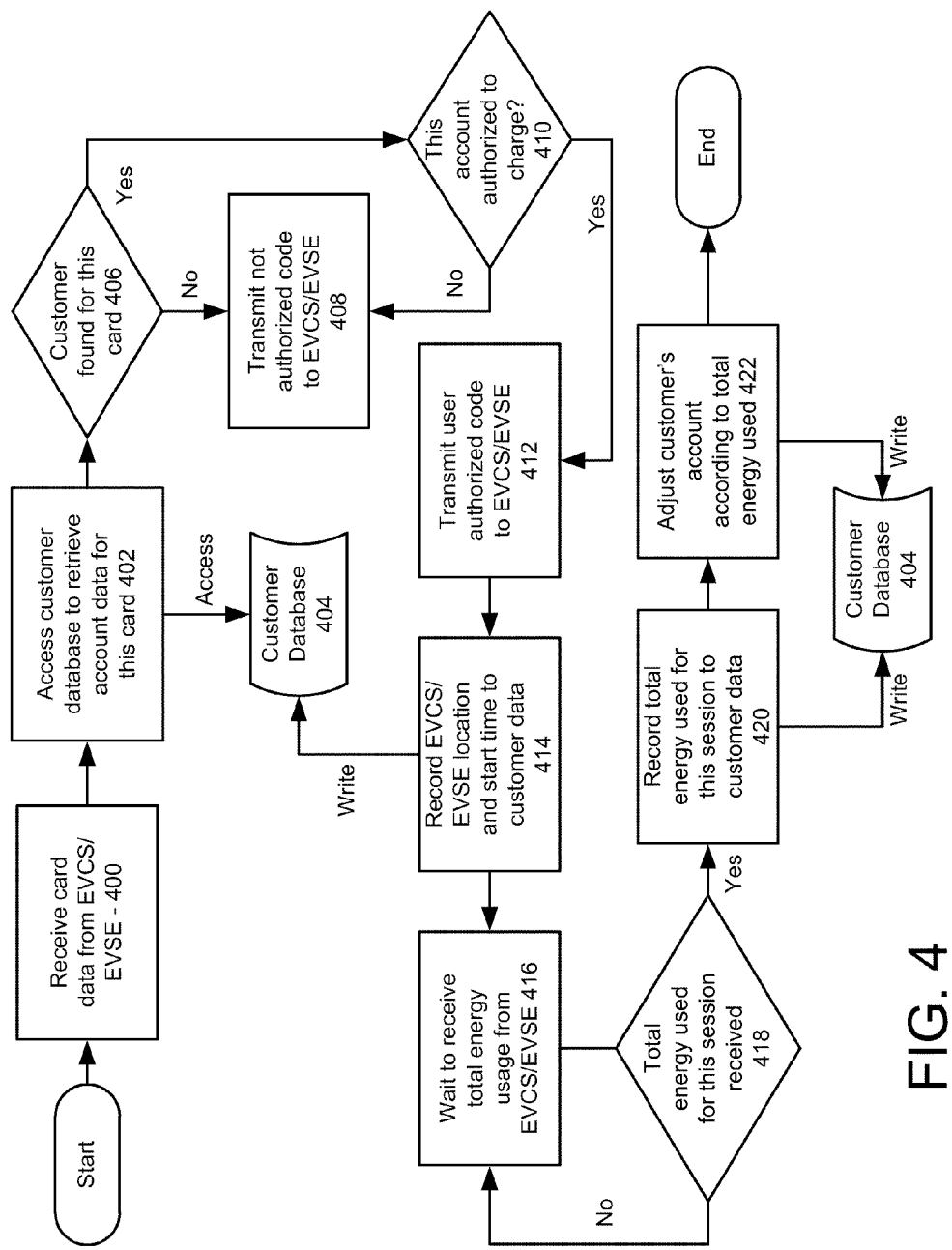
FIG. 4 is a flowchart of an exemplary method for operating a back office system supporting the charging operation performed by the EVCS/EVSE.

FIG. 4 is a flow chart showing an exemplary process performed by a back office server coupled to an EVCS/EVSE implementing the method shown in FIG. 3 or other such method. As noted above, the functionality shown in FIG. 4 can be implemented by computing hardware executing computer-executable instructions. The various procedures shown in FIG. 4 should not be construed as limiting, as any one or more of the procedures can be performed alone or in various other combinations and subcombinations in accordance with the disclosed technology.

When the back office server receives card data from an EVCS/EVSE (process block 400), the back office server will access a customer database 404 (process block 402) and determine if there is a customer or user in the customer database corresponding to the received card data (process block 406). If a corresponding customer or user is not found, a code is transmitted to the EVCS/EVSE indicating that the card is not authorized (process block 408). If a corresponding customer is found in the database, the back office server will use this customer's data to determine if the customer is allowed access to this EVCS/EVSE (process block 410). This determination could be based on a financial analysis (e.g., an analysis to determine whether there are sufficient funds in the customer's account), a membership analysis (e.g., an analysis to determine whether the customer is a member of an authorized group of members who can use this station), or some other criteria or combination thereof. For example, in some embodiments, charging operations are provided at no cost or at some nominal or other cost below the market price to users who have joined the charging network. If the customer is authorized to use the EVCS/EVSE, a code is sent to the EVCS/EVSE stating that the user is authorized (process block 412). The back office server can record the location and start time of the charging session as part of the customer's data stored in the customer database 404 (process block 414). The back office server can then wait to receive a message from the EVCS/EVSE indicating the total energy usage from the current charging session (process blocks 416, 418). Once the total energy usage message is received, the back office server can record the total energy used for this session (process block 420) and update the customer's data stored in the customer database 404 accordingly (process block 422). In other embodiments, charging is provided free of charge to all users of the charging station, eliminating the need for any authorization at the EVCS/EVSE.

In some embodiments, at least some of the user data is stored locally at the EVCS/EVSE. Storing the user data locally reduces the number of communications that need to be made to the back office server and increases the speed with which transactions with the user can be performed. In particular embodiments, the locally stored user data is only a portion of the user data for the entire system. This partial database can be created based on a number of criteria. For example, the user data stored in the partial database can be for users with a home address within a certain radius of the EVCS/EVSE, for users who have used the EVCS/EVSE before (e.g., within the last x days), or a combination of such criteria. During operation, when the user of the EVCS/EVSE swipes their card (or otherwise provide user information to the EVCS/EVSE), software executing at the EVCS/EVSE can first evaluate the locally stored user data to determine whether the user is an authorized user. If the user is not identified using the locally stored user data, then the EVCS/EVSE can transmit the user information to the back office server in order to retrieve an authorization code for the user.

III. Further Embodiments

Having described and illustrated the principles of the disclosed technology in the detailed description and accompanying drawings, it will be recognized that the various embodiments can be modified in arrangement and detail without departing from such principles. Furthermore, any features or aspects of the disclosed embodiments can be used in various combinations and subcombinations with one another. For example, the following paragraphs describe other possible embodiments of the disclosed technology.

One exemplary embodiment is a method comprising displaying a user interface on a touch screen of an electric vehicle charging station ("EVCS") or electric vehicle supply equipment ("EVSE").

Another exemplary embodiment comprises one or more computer-readable media storing computer-executable instructions which when executed by a computer cause the computer to provide a user interface on a touch screen of an EVCS or EVSE.

A further exemplary embodiment is an EVCS or EVSE comprising a touch screen. The EVCS or EVSE can further comprise one or more computer-readable media storing computer-executable instructions for controlling the touch screen. The EVCS or EVSE can further comprise one or more power receptacles capable of delivering electricity to one or more vehicles respectively coupled to the one or more power receptacles. The EVCS or EVSE can further comprise one or more of an electric current control integrated circuit card, an access control device, a communication radio, or a network interface card.

Another exemplary embodiment is a method comprising receiving data from an EVCS or EVSE, the data identifying a user at the EVCS or EVSE; and using computing hardware, accessing status data, maintenance data, or both status data and maintenance data associated with the user. A related embodiment comprises one or more computer-readable media storing computer-executable instructions which when executed by a computer cause the computer to perform the method.

A further embodiment is a computer configured to receive data from an EVCS or EVSE, the data identifying a user currently at the EVCS or EVSE, and to access status data, maintenance data, or both status data and maintenance data associated with the user.

Another exemplary embodiment is a method comprising, using computing hardware, sending user data associated with a user at an EVCS or EVSE to a back office computer; and using the computing hardware, receiving authorization data from the back office computer, the authorization data indicating that the user is authorized to use the EVCS or EVSE. A related embodiment comprises one or more computer-readable media storing computer-executable instructions which when executed by a computer cause the computer to perform the method.

A further embodiment is an EVCS or EVSE comprising computing hardware configured to send user data associated with a user at an EVCS or EVSE to a back office computer and receive authorization data from the back office computer, the authorization data indicating that the user is authorized to use the EVCS or EVSE.

Another exemplary embodiment is a method comprising displaying a user interface on a display device, the user interface allowing an EVCS operator or EVSE operator to exchange data with a remotely located EVCS or EVSE. A related embodiment comprises one or more computer-readable media storing computer-executable instructions which when executed by a computer cause the computer to perform a method, the method comprising providing a user interface that allows an EVCS operator or EVSE operator to exchange data with a remotely located EVCS or EVSE.

In a further embodiment, a method comprises using computing hardware, controlling an exchange of messages between one or more EVCSs or EVSE and a server, wherein the controlling comprises using message priorities to allow higher priority messages to take priority over lower priority messages, the higher priority messages including one or more of a message indicating that an electric vehicle is authorized to use a respective EVCS or EVSE, or a message indicating an emergency at a respective EVCS or EVSE, the lower priority messages including one or more of a message indicating vehicle health data or a message indicating vehicle charging statistics. A related embodiment comprises one or more computer-readable media storing computer-executable instructions which when executed by a computer cause the computer to perform the method.

Another exemplary embodiment is a method comprising using a processor, storing electric vehicle health data or other data associated with a charging history of an electric vehicle on one or more computer-readable media, the electric vehicle health data including expiration information indicating a time period after which the electric vehicle health data expires; and deleting the electric vehicle health data or the other data associated with a charging history of an electric vehicle when the time period has elapsed. A related embodiment comprises one or more computer-readable media storing computer-executable instructions which when executed by a computer cause the computer to perform the method.

Furthermore, it is to be understood that any of the features and embodiments described herein can be used in combination with any of the features and embodiments described in U.S. Provisional Application No. 61/307,318, filed on Feb. 23, 2010, and entitled "ELECTRIC VEHICLE CHARGING STATION WITH TOUCH SCREEN USER INTERFACE"; U.S. Provisional Application No. 61/409,108, filed on Nov. 1, 2010, and entitled "ELECTRIC VEHICLE CHARGING STATION WITH TOUCH SCREEN USER INTERFACE"; U.S. Provisional Application No. 61/307,377, filed on Feb. 23, 2010, and entitled "ELECTRIC VEHICLE CHARGING STATION ADVERTISING SYSTEM"; U.S. Provisional Application No. 61/353,944, filed on Jun. 11, 2010, and entitled "ELECTRIC VEHICLE CHARGING STATION ADVERTISING SYSTEM"; U.S. Provisional Application No. 61/317,181, filed on Mar. 24, 2010, and entitled "ELECTRIC VEHICLE CHARGING STATION PARKING METER SYSTEM"; and U.S. Nonprovisional application Ser. No. 12/954,209, filed on Nov. 24, 2010, and entitled "ELECTRIC VEHICLE CHARGING STATION ADVERTISING SYSTEMS", all of which are hereby incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

What is claimed is:

1. A method of operating an electric vehicle charging station ("EVCS") or electric vehicle supply equipment ("EVSE"), comprising:
    displaying a user interface on a display device of the EVCS or EVSE;
    receiving an indication of user interaction with the EVCS or EVSE, the user interaction being received via a touch screen interface associated with the display device;
    facilitating a transaction between a user and the EVCS or EVSE by which the user indicates that one or more electric vehicle batteries of an electric vehicle are to be charged via one of one or more charging ports of the EVCS or EVSE; and
    controlling a charging operation that provides an electric charge to the one or more electric vehicle batteries of the electric vehicle via the one of the one or more charging ports of the EVCS or EVSE,
    wherein the facilitating a transaction between the user and the EVCS or EVSE comprises:
    displaying on the display device graphical depictions of available ones of the one or more charging ports; and
    receiving data through the touch screen interface indicating that the user touched a selected one of the graphical depictions, the selected one of the graphical depictions corresponding to the one of the one or more charging ports of the EVSE or EVSE through which the charging operation is provided.

2. The method of claim 1, wherein the facilitating the transaction between the user and the EVCS or EVSE comprises:
    receiving user identification information; and
    determining whether the user is authorized to use the EVCS or EVSE based on the user identification information.

3. The method of claim 2, wherein the determining whether the user is authorized to use the EVCS or EVSE comprises accessing user data stored locally at the EVCS or EVSE.

4. The method of claim 2, wherein the determining whether the user is authorized to use the EVCS or EVSE comprises:
    transmitting at least a portion of the user identification information to a remote computer; and
    receiving a response from the remote computer indicating whether the user is authorized to use the EVCS or EVSE.

5. A method of operating an electric vehicle charging station ("EVCS") or electric vehicle supply equipment ("EVSE"), comprising:
    displaying a user interface on a display device of the EVCS or EVSE;
    receiving an indication of user interaction with the EVCS or EVSE, the user interaction being received via a touch screen interface associated with the display device;
    facilitating a transaction between a user and the EVCS or EVSE by which the user indicates that one or more electric vehicle batteries of an electric vehicle are to be charged via one of one or more charging ports of the EVCS or EVSE; and controlling a charging operation that provides an electric charge to the one or more electric vehicle batteries of the electric vehicle via the one of the one or more charging ports of the EVCS or EVSE, wherein the facilitating a transaction between the user and the EVCS or EVSE comprises:

displaying on the display device graphical depictions of two or more available methods of authorizing the charging operation; and receiving data through the touch screen interface indicating that the user touched a selected one of the graphical depictions.

6. The method of claim 5, wherein the two or more available methods of authorizing the charging operation include authorization through use of a credit card and authorization through use of a card indicating membership in an authorized group.

7. A method of operating an electric vehicle charging station ("EVCS") or electric vehicle supply equipment ("EVSE"), comprising:

displaying a user interface on a display device of the EVCS or EVSE;

receiving an indication of user interaction with the EVCS or EVSE, the user interaction being received via a touch screen interface associated with the display device;

facilitating a transaction between a user and the EVCS or EVSE by which the user indicates that one or more electric vehicle batteries of an electric vehicle are to be charged via one of one or more charging ports of the EVCS or EVSE; and controlling a charging operation that provides an electric charge to the one or more electric vehicle batteries of the electric vehicle via the one of the one or more charging ports of the EVCS or EVSE, wherein the facilitating a transaction between the user and the EVCS or EVSE comprises:

detecting that the electric vehicle is not connected to the one of the one or more charging ports; and displaying on the display device pictorial instructions for connecting the electric vehicle to the one of the one or more charging ports.

8. A method of operating an electric vehicle charging station ("EVCS") or electric vehicle supply equipment ("EVSE"), comprising:

displaying a user interface on a display device of the EVCS or EVSE;

receiving an indication of user interaction with the EVCS or EVSE, the user interaction being received via a touch screen interface associated with the display device;

facilitating a transaction between a user and the EVCS or EVSE by which the user indicates that one or more electric vehicle batteries of an electric vehicle are to be charged via one of one or more charging ports of the EVCS or EVSE; and controlling a charging operation that provides an electric charge to the one or more electric vehicle batteries of the electric vehicle via the one of the one or more charging ports of the EVCS or EVSE, wherein the controlling the charging operation comprises receiving a message from a remote computer indicating that the user is authorized to use the EVCS or EVSE, the received message including a portion of the message that indicates a priority level of the message.

9. The method of claim 8, wherein the priority level of the message indicates a higher priority for the message relative to a message from the remote computer indicating vehicle health data or vehicle charging statistics.

10. The method of claim 8, wherein the priority level of the message indicates a lower priority for the message relative to a message from the remote computer directing the EVCS or EVSE to stop charging.

11. The method of claim 8, further comprising receiving a message from the remote computer, the message including a portion indicative of a message expiration time.

12. One or more non-transitory computer-readable media storing computer-executable instructions which when executed by the computer processor cause the computer process to perform a method of operating an electric vehicle charging station ("EVCS") or electric vehicle supply equipment ("EVSE"), the method comprising:

displaying a user interface on a display device of the EVCS or EVSE;

receiving an indication of user interaction with the EVCS or EVSE, the user interaction being received via a touch screen interface associated with the display device;

facilitating a transaction between a user and the EVCS or EVSE by which the user indicates that one or more electric vehicle batteries of an electric vehicle are to be charged via one of one or more charging ports of the EVCS or EVSE; and controlling a charging operation that provides an electric charge to the one or more electric vehicle batteries of the electric vehicle via the one of the one or more charging ports of the EVCS or EVSE, wherein the facilitating a transaction between the user and the EVCS or EVSE comprises:

displaying on the display device graphical depictions of available ones of the one or more charging ports; and receiving data through the touch screen interface indicating that the user touched a selected one of the graphical depictions, the selected one of the graphical depictions corresponding to the one of the one or more charging ports of the EVSE or EVSE through which the charging operation is provided.

13. The one or more non-transitory computer-readable media of claim 12, wherein the facilitating the transaction between the user and the EVCS or EVSE comprises:

receiving user identification information; and determining whether the user is authorized to use the EVCS or EVSE based on the user identification information.

14. The one or more non-transitory computer-readable media of claim 13, wherein the determining whether the user is authorized to use the EVCS or EVSE comprises accessing user data stored locally at the EVCS or EVSE.

15. The one or more non-transitory computer-readable media of claim 13, wherein the determining whether the user is authorized to use the EVCS or EVSE comprises:

transmitting at least a portion of the user identification information to a remote computer; and receiving a response from the remote computer indicating whether the user is authorized to use the EVCS or EVSE.

16. An electric vehicle charging station ("EVCS") or electric vehicle supply equipment ("EVSE") comprising:

two or more charging ports configured to be coupled to an electric vehicle and to charge one or more batteries of the electric vehicle;

a display device, the display device having a touch screen interface;

a computer processor, the computer processor being programmed to:
cause a user interface screen to be displayed on the display device, the user interface screen prompting the user to select one of the two or more charging ports; and
receive data from the touch screen interface indicating user selection of a selected one of the two or more charging ports.

17. The EVCS or EVSE of claim 16, wherein the computer processor is further programmed to:
cause a second user interface screen to be displayed on the display device, the second user interface prompting the user to select one of two or more methods of authorizing a charging operation at the selected one of the two or more charging ports; and
receive data from the touch screen interface indicating user selection of a selected one of the two or more methods of authorizing a charging operation.

18. The EVCS or EVSE of claim 16, wherein the user interface screen is a first user interface screen,
wherein the EVCS or EVSE further comprises a wireless communication device, and
wherein the processor is further programmed to:
receive user identification data at the EVCS or EVSE;
cause transmission of at least a portion of the user identification information to a remote server via the wireless communication device; and
cause reception of a response from the remote server via the wireless communication device, the response indicating whether the user is authorized to use the EVCS or EVSE.

19. The EVCS or EVSE of claim 18, wherein the communication device comprises one of a wireless mesh radio or a cellular radio.

20. The EVCS or EVSE of claim 18, wherein the EVCS or EVSE further comprises a card reader; and wherein the user identification data is received from the card reader.

21. A method, comprising:
using computing hardware, controlling transmission of messages from a server to one or more EVCSs or EVSE, wherein the controlling comprises:
assigning message priority levels to multiple messages, each of the assigned message priority levels being one of multiple available message priority levels, and
controlling transmission of the messages such that messages assigned to a higher message priority level are transmitted sooner than message assigned to a lower message priority level.

22. The method of claim 21, wherein the controlling the transmission of the message comprises:
ordering the messages in a message queue according to the assigned message priority levels; and
storing the message queue in a message database.

23. The method of claim 21, wherein the assigning the message priority level comprises assigning a higher message priority level to a message indicating that charging at one or more EVCSs or EVSEs is to stop relative to at least one other message priority level.

24. The method of claim 21, wherein the assigning the message priority level comprises assigning a higher message priority level to a message indicating that charging is authorized at one or more EVCSs or EVSEs relative to at least one other message priority level.

25. The method of claim 21, wherein the assigning the message priority level comprises assigning a lower message priority level to a message indicating vehicle maintenance data or charge history data relative to at least one other message priority level.

26. The method of claim 21, wherein the controlling transmission of messages from a server to one or more EVCSs or EVSE further comprises assigning a message expiration time to one or more of the messages, the assigned message expiration time indicating a time at which the one or more messages are to be disregarded by the one or more EVCSs or EVSE.

27. The method of claim 21, wherein one or more of the messages include one or more of the following attributes: a network security software version number, an EVCS/EVSE identity number, a message identity number, a message priority level, an expiration timestamp, or cyclic redundancy data.

28. The method of claim 21, wherein the controlling transmission of the messages comprises:
interrupting transmission of a message with a lower message priority level in order to transmit a message with a higher message priority level.

29. The method of claim 21, wherein the controlling transmission of the messages comprises transmitting a message to one or more EVCSs/EVSE requesting that charging at the one or more EVCSs/EVSE cease, the transmission of the message being in response to power grid usage exceeding a threshold usage value or electrical prices exceeding a threshold price.

30. One or more non-transitory computer-readable media storing computer-executable instructions which when executed by the computer processor cause the computer process to perform a method, the method comprising:
controlling transmission of messages from a server to one or more EVCSs or EVSE, wherein the controlling comprises:
assigning message priority levels to multiple messages, each of the assigned message priority levels being one of multiple available message priority levels, and
controlling transmission of the messages such that messages assigned to a higher message priority level are transmitted sooner than message assigned to a lower message priority level.

31. The one or more non-transitory computer-readable media of claim 30, wherein the controlling the transmission of the message comprises:
ordering the messages in a message queue according to the assigned message priority levels; and
storing the message queue in a message database.

32. The one or more non-transitory computer-readable media of claim 30, wherein the assigning the message priority level comprises one or more of assigning a higher message priority level to a message indicating that charging at one or more EVCSs or EVSEs is to stop relative to at least one other message priority level, assigning a higher message priority level to a message indicating that charging is authorized at one or more EVCSs or EVSEs relative to at least one other message priority level, or assigning a lower message priority level to a message indicating vehicle maintenance data or charge history data relative to at least one other message priority level.

33. The one or more non-transitory computer-readable media of claim 30, wherein the controlling transmission of messages from a server to one or more EVCSs or EVSE further comprises assigning a message expiration time to one or more of the messages, the assigned message expiration time indicating a time at which the one or more messages are to be disregarded by the one or more EVCSs or EVSE.

34. The one or more non-transitory computer-readable media of claim 30, wherein one or more of the messages include one or more of the following attributes: a network security software version number, an EVCS/EVSE identity number, a message identity number, a message priority level, an expiration timestamp, or cyclic redundancy data.

35. The one or more non-transitory computer-readable media of claim 30, wherein the controlling transmission of the messages comprises:
interrupting transmission of a message with a lower message priority level in order to transmit a message with a higher message priority level.

36. The one or more non-transitory computer-readable media of claim 30, wherein the controlling transmission of the messages comprises transmitting a message to one or more EVCSs/EVSE requesting that charging at the one or more EVCSs/EVSE cease, the transmission of the message being in response to power grid usage exceeding a threshold usage value or electrical prices exceeding a threshold price.

37. One or more non-transitory computer-readable media storing computer-executable instructions which when executed by the computer processor cause the computer process to perform a method of operating an electric vehicle charging station ("EVCS") or electric vehicle supply equipment ("EVSE"), the method comprising:
displaying a user interface on a display device of the EVCS or EVSE;
receiving an indication of user interaction with the EVCS or EVSE, the user interaction being received via a touch screen interface associated with the display device;
facilitating a transaction between a user and the EVCS or EVSE by which the user indicates that one or more electric vehicle batteries of an electric vehicle are to be charged via one of one or more charging ports of the EVCS or EVSE; and
controlling a charging operation that provides an electric charge to the one or more electric vehicle batteries of the electric vehicle via the one of the one or more charging ports of the EVCS or EVSE,
wherein the facilitating a transaction between the user and the EVCS or EVSE comprises:
displaying on the display device graphical depictions of two or more available methods of authorizing the charging operation; and
receiving data through the touch screen interface indicating that the user touched a selected one of the graphical depictions.

38. The one or more non-transitory computer-readable media of claim 37, wherein the two or more available methods of authorizing the charging operation include authorization through use of a credit card and authorization through use of a card indicating membership in an authorized group.

39. One or more non-transitory computer-readable media storing computer-executable instructions which when executed by the computer processor cause the computer process to perform a method of operating an electric vehicle charging station ("EVCS") or electric vehicle supply equipment ("EVSE"), the method comprising:
displaying a user interface on a display device of the EVCS or EVSE;
receiving an indication of user interaction with the EVCS or EVSE, the user interaction being received via a touch screen interface associated with the display device;
facilitating a transaction between a user and the EVCS or EVSE by which the user indicates that one or more electric vehicle batteries of an electric vehicle are to be charged via one of one or more charging ports of the EVCS or EVSE; and
controlling a charging operation that provides an electric charge to the one or more electric vehicle batteries of the electric vehicle via the one of the one or more charging ports of the EVCS or EVSE,
wherein the facilitating a transaction between the user and the EVCS or EVSE comprises:
detecting that the electric vehicle is not connected to the one of the one or more charging ports; and
displaying on the display device pictorial instructions for connecting the electric vehicle to the one of the one or more charging ports.

40. One or more non-transitory computer-readable media storing computer-executable instructions which when executed by the computer processor cause the computer process to perform a method of operating an electric vehicle charging station ("EVCS") or electric vehicle supply equipment ("EVSE"), the method comprising:
displaying a user interface on a display device of the EVCS or EVSE;
receiving an indication of user interaction with the EVCS or EVSE, the user interaction being received via a touch screen interface associated with the display device;
facilitating a transaction between a user and the EVCS or EVSE by which the user indicates that one or more electric vehicle batteries of an electric vehicle are to be charged via one of one or more charging ports of the EVCS or EVSE; and
controlling a charging operation that provides an electric charge to the one or more electric vehicle batteries of the electric vehicle via the one of the one or more charging ports of the EVCS or EVSE,
wherein the controlling the charging operation comprises receiving a message from a remote computer indicating that the user is authorized to use the EVCS or EVSE, the received message including a portion of the message that indicates a priority level of the message.

41. The one or more non-transitory computer-readable media of claim 40, wherein the priority level of the message indicates a higher priority for the message relative to a message from the remote computer indicating vehicle health data or vehicle charging statistics.

42. The one or more non-transitory computer-readable media of claim 40, wherein the priority level of the message indicates a lower priority for the message relative to a message from the remote computer directing the EVCS or EVSE to stop charging.

* * * * *